United States Patent [19]

Upmeier

[11] 3,852,013
[45] Dec. 3, 1974

[54] EXTRUDER FOR PLASTICS MATERIAL, PARTICULARLY THERMOPLASTIC OR NON-CROSS-LINKED ELASTOMERIC MATERIALS

[76] Inventor: Hartmut Upmeier, zum kahlen Berg 11, 4542 Tecklenburg, Germany

[22] Filed: Sept. 19, 1973

[21] Appl. No.: 398,794

[30] Foreign Application Priority Data
Sept. 19, 1972 Germany............................ 2245820

[52] U.S. Cl..................... 425/376, 137/610, 259/4
[51] Int. Cl.............................................. B29f 3/02
[58] Field of Search .......... 425/461, 462, 463, 464, 425/376, 378, 131.5, 378 S; 259/4; 137/561 A, 561 R, 610

[56] References Cited
UNITED STATES PATENTS
| | | | |
|---|---|---|---|
| 3,492,692 | 2/1970 | Soda et al...................... | 425/464 X |
| 3,802,825 | 4/1974 | Upmeier........................... | 425/378 |
| 3,807,917 | 4/1974 | Shimoda et al................ | 425/463 X |

Primary Examiner—R. Spencer Annear
Assistant Examiner—Mark Rosenbaum
Attorney, Agent, or Firm—Fleit & Jacobson

[57] ABSTRACT

In an extruder according to the parent patent, each outermost laminar channel is sub-divided by means of a central blade so that one half opens into one of the part-passages and the other half opens into the other part-passage.

2 Claims, 1 Drawing Figure

PATENTED DEC 31 1974 3,852,013
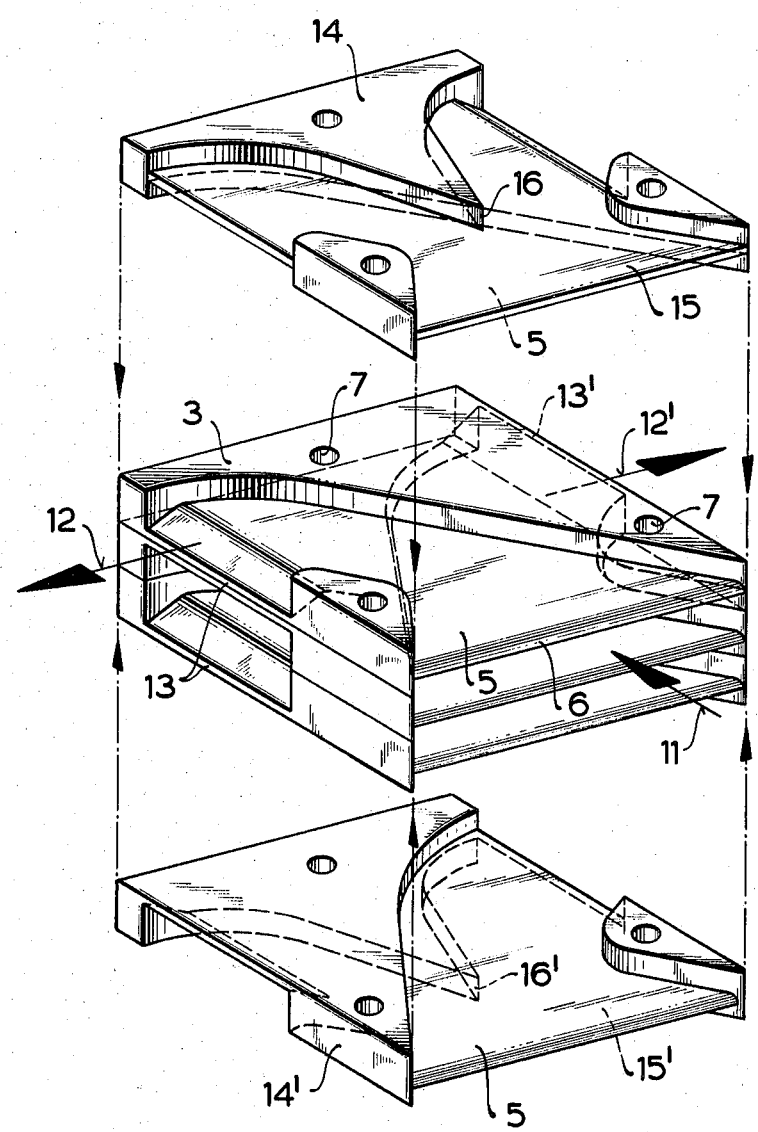

EXTRUDER FOR PLASTICS MATERIAL, PARTICULARLY THERMOPLASTIC OR NON-CROSS-LINKED ELASTOMERIC MATERIALS

The invention relates to an improvement in or modification of the extruder described in the parent British Specification 1,330,858 (German Specification 19,56,652).

The parent specification relates to an extruder for working on plastics material, particularly thermoplastic or non-cross-linked elastomeric material, wherein a supply passage for the material is provided with a distributor for dividing the flow of material into two or more branch passages leading to processing tools for the material, and the distributor comprises conduits corresponding in number to the number of branch passages, the inlets of said conduits being disposed in the supply passage and said conduits opening into a respective one of the branch passages, wherein further the conduits comprise a plurality of laminar channels which open on alternate sides into a respective one of the branch passages and the inlets of which extend over the entire cross-section of the supply passage.

It has been found that the function of the distributor is satisfactory when considering the radial temperature profiles but that the boundary layer material adhering to the supply passage is unevenly distributed to the part-passages. Thus, if the distributor comprises a plurality of superposed plates, and an even number of such plates is provided, the boundary layer material adhering to the upper wall of the passage is led into only one of the branch passages and the boundary layer material adhering to the lower wall of the supply passage is led only into the other branch passage. If there is an uneven number, such non-uniformity is even worse because then the entire boundary layer material at the top and bottom of the wall of the passage is passed into one and the same branch passage.

The invention aims to provide an extruder in which the boundary layer material is also uniformly distributed to the part-passages. According to the invention, in an extruder as above referred to each outermost laminar channel is sub-divided by means of a central blade so that one half opens into one of the part-passages and the other half opens into the other part-passage. In view of the low height of each laminar channel, the resulting error in the radial temperature profile at the marginal zone is negligibly small.

When using distributor plates of the kind described in the parent specification, an uneven number of such plates provided with milled laminar channels may be employed because in that case the end plates can be identical; if there is an even number of plates, the end plates must be a mirror image of one another.

An example of the invention is illustrated in the accompanying diagrammatic drawing showing an exploded perspective view of a distributor for the extruder.

The body of the distributor is formed from any desired number of distributor plates 3 which are superposed or juxtaposed in mirror image formation and are constructed as described in the parent specification. By means of the separating bars 6, the flow of plastics material coming from a supply passage indicated by arrow 11 is subdivided in laminar manner into the part-passages indicated by arrows 12, 12', the part-passages 5 terminating in the blades 13, 13'.

The outermost passages 15, 15' of the end distributor plates 14, 14' are provided with central blades 16, 16' which divide the boundary layer material in the outermost channels 15, 15' to flow into both the part-passages 12, 12'. This is done in that the outer-most laminar channels have one half opening into one of the part-passages and the other half into the other part-passage. If the central distributor plates 3 are provided in an odd number, the end plates 14, 14' will be identical; for an even number of plates 3, the end plates 14, 14' must be a mirror image of one another.

The individual distributor plates 3, 14, 14' are interconnected by bolts, studs or screws 7.

I claim:

1. An extruder for plastics material, wherein a supply passage for the material is provided with a distributor for dividing the flow of material into two or more branch passages leading to processing tools for the material, and the distributor comprises conduits corresponding in number to the number of branch passages, the inlets of said conduits being disposed in the supply passage and said conduits opening into a respective one of the branch passages, wherein further the conduits comprise a plurality of laminar channels which open on alternate sides into a respective one of the branch passages and the inlets of which extend over the entire cross-section of the supply passage, each outermost laminar channel being subdivided by means of a central blade so that one half opens into one of the part-passages and the other half opens into the other part-passage.

2. An extruder according to claim 1, wherein an uneven number of distributor plates is provided with milled laminar channels.

* * * * *